United States Patent [19]

Weis et al.

[11] Patent Number: 4,552,573
[45] Date of Patent: Nov. 12, 1985

[54] DUST SUPPRESSOR APPARATUS

[75] Inventors: Bruce T. Weis, Anoka; Nash N. Helmy, St. Louis Park; David E. Tweet; Bruce W. Moechnig, both of Minneapolis, all of Minn.

[73] Assignee: Cargill Incorporated, Minneapolis, Minn.

[21] Appl. No.: 556,312

[22] Filed: Nov. 30, 1983

Related U.S. Application Data

[63] Continuation-in-part of Ser. No. 357,787, Mar. 12, 1982, abandoned.

[51] Int. Cl.[4] .................. B01D 45/02; B01D 45/08
[52] U.S. Cl. .......................... 55/312; 55/426; 55/432; 55/433; 55/465; 55/466; 55/DIG. 32; 141/52; 141/93; 141/248; 141/286; 193/31 R; 193/32; 406/168; 406/169; 414/291
[58] Field of Search ............... 55/312, 314, 426, 432, 55/433, 435, 465, 466, DIG. 32; 193/29, 31 R, 32; 141/52, 93, 248, 286; 406/168, 169; 414/291

[56] References Cited

U.S. PATENT DOCUMENTS

| | | | |
|---|---|---|---|
| 289,316 | 11/1883 | Smith | 406/169 |
| 440,751 | 11/1890 | Wilde | 193/31 R X |
| 489,340 | 1/1893 | Stoner | 406/168 X |
| 1,029,571 | 6/1912 | Day | 406/168 X |
| 1,270,147 | 6/1918 | Gollinge | 55/432 X |
| 1,285,783 | 11/1918 | Nall | 406/169 X |
| 1,890,562 | 12/1932 | Clute | 406/168 |
| 2,634,842 | 4/1953 | Caylor | 193/32 |
| 2,792,910 | 5/1957 | Redniss | 55/432 X |
| 3,739,893 | 6/1973 | Kaufmann | 141/93 X |
| 3,902,601 | 9/1975 | Townley | 55/435 X |

Primary Examiner—Kathleen J. Prunner
Attorney, Agent, or Firm—Fitch, Even, Tabin & Flannery

[57] ABSTRACT

A dust suppressor apparatus for use in discharging particulate or granular material, such as grain, which includes a housing defining an internal chamber and having an inlet opening in the upper region of the chamber and a discharge opening in the lower region of the chamber. A suppressor control gate is hingedly mounted on the housing and is biased to a position preventing discharge of material through the discharge opening until a predetermined quantity of particulate material acts on the control gate to overcome the biasing and open the control gate. The control gate and is operative to exert pressure on the particulate material discharging through the discharge opening so as to enable bulk discharge while preventing egress of dust ladened air through the discharge opening. Baffle plates are provided in the chamber to reduce grain velocity within the device. The baffle plates may be independently adjustable or may be automatically adjusted upon tilting of the apparatus. A bypass opening is selectively operable to enable passage of material through the dust suppressor so as to bypass the discharge opening and facilitate transfer to a location spaced from the dust suppressor apparatus.

11 Claims, 10 Drawing Figures

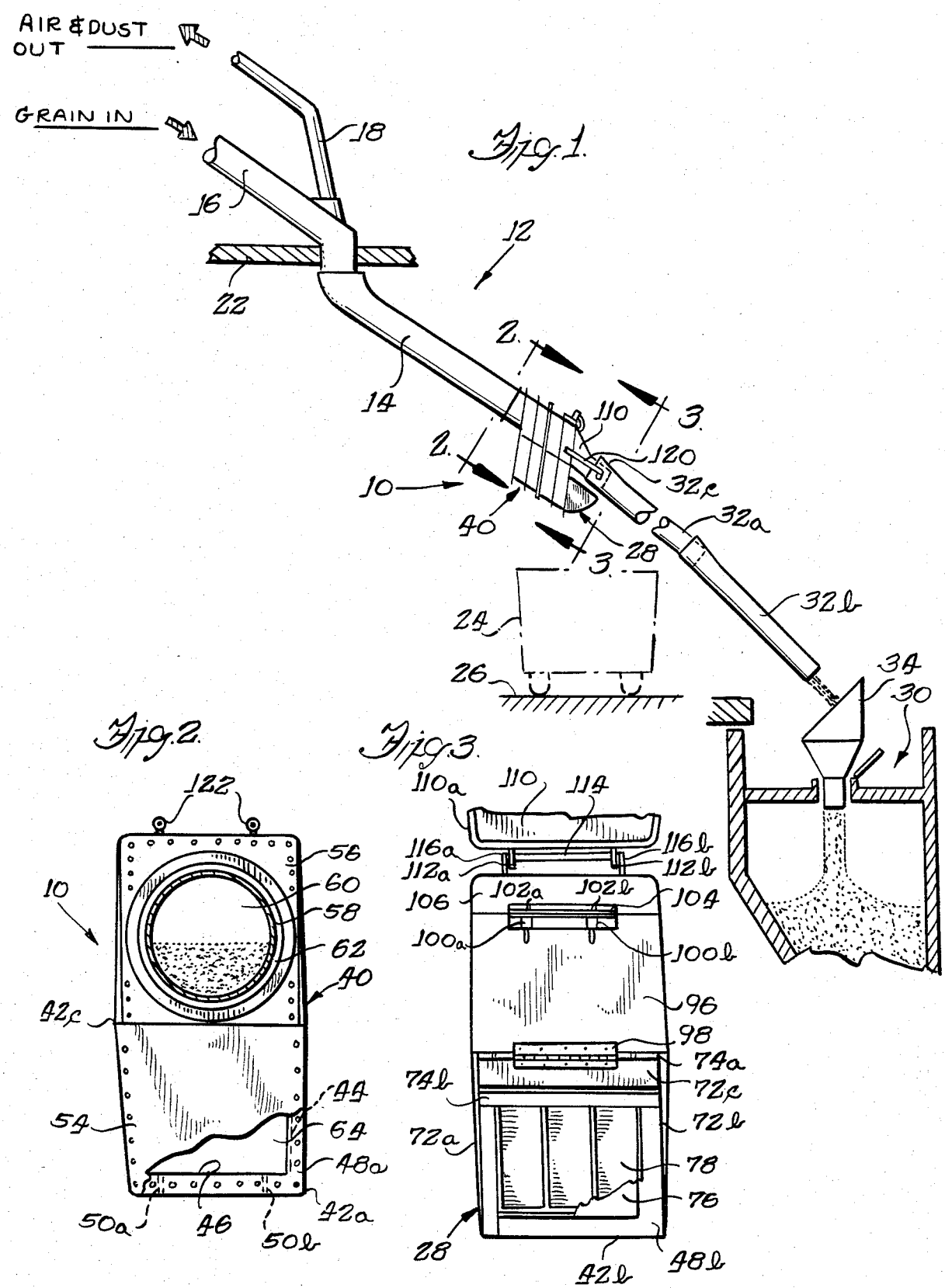

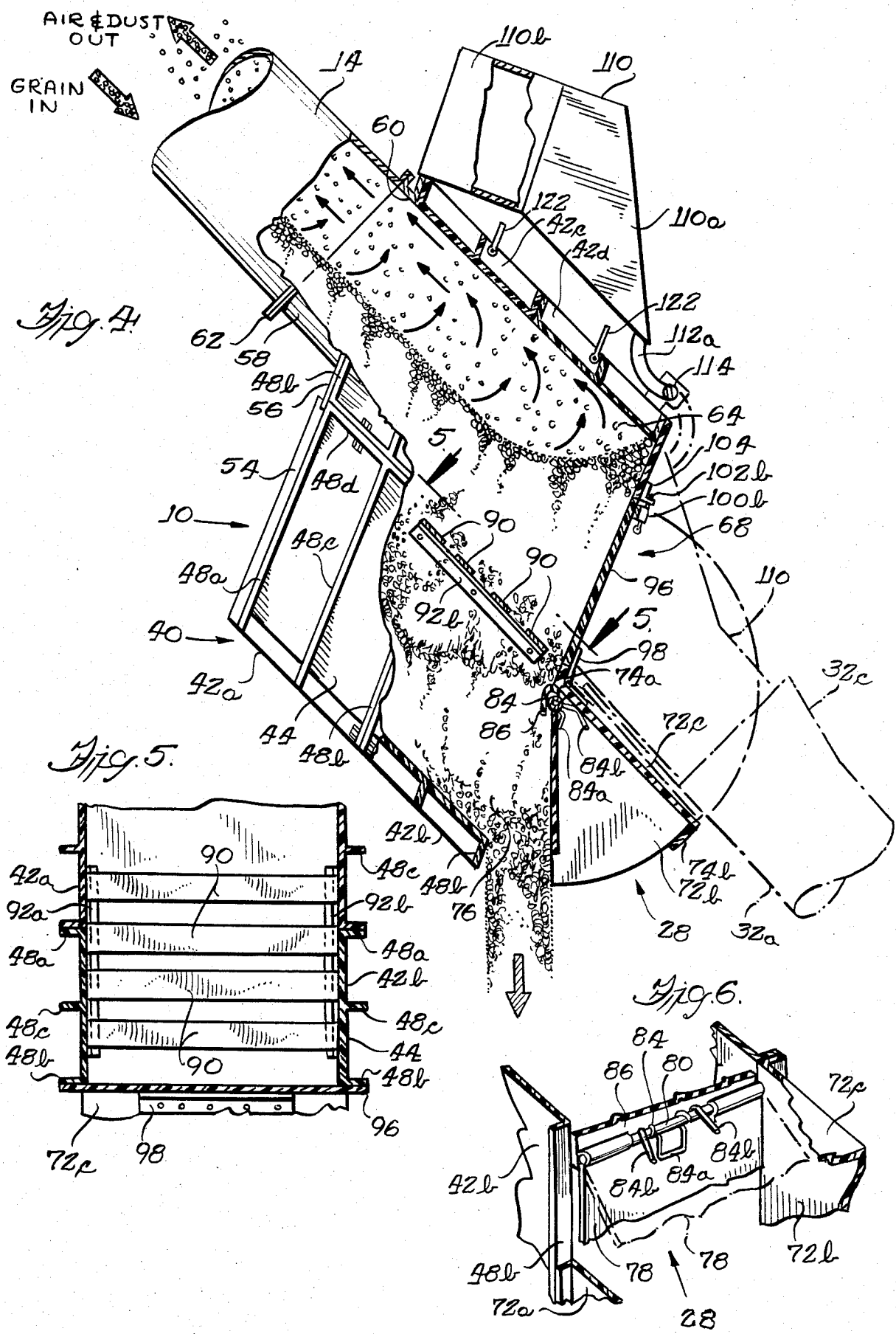

FIG. 7
FIG. 8
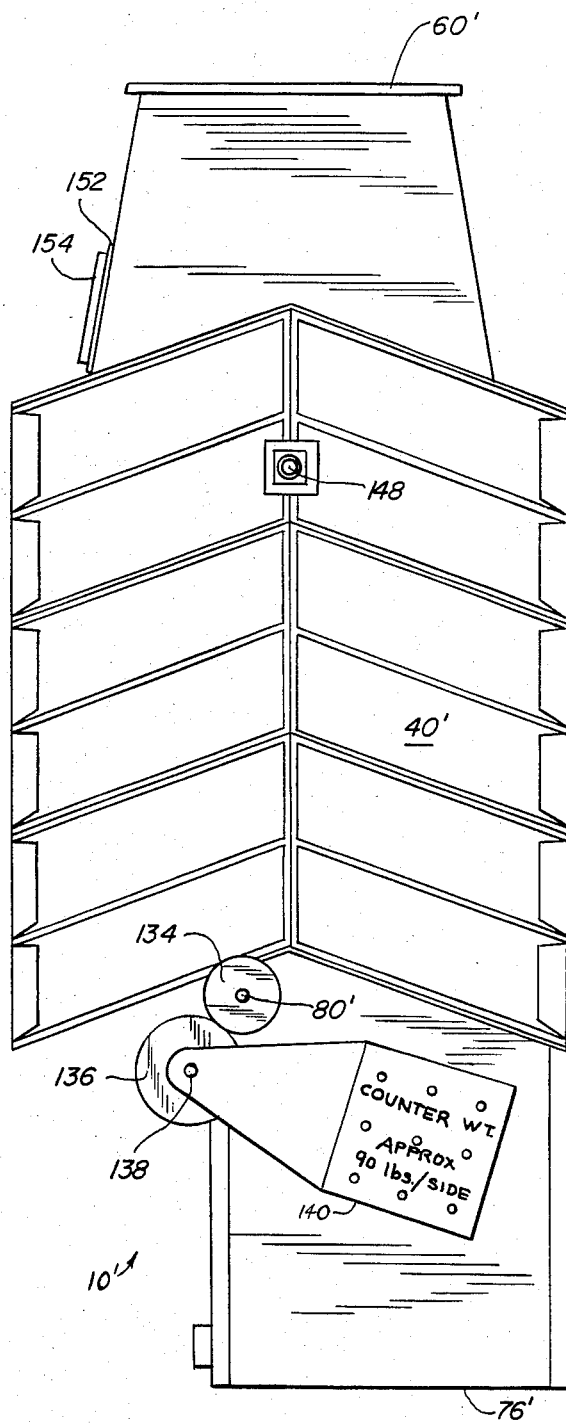
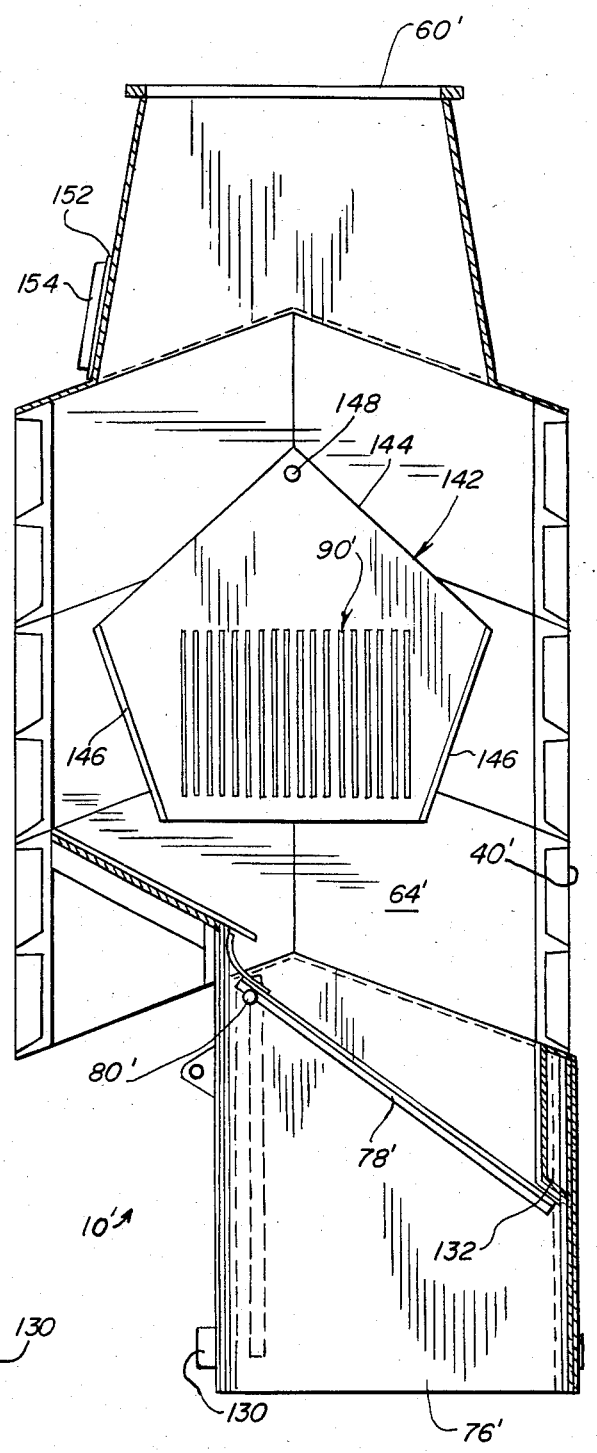

DUST SUPPRESSOR APPARATUS

BACKGROUND OF THE INVENTION

This application is a continuation-in-part of application Ser. No. 357,787, entitled "Dust Suppressor Apparatus" filed Mar. 12, 1982, now abandoned.

The present invention relates generally to apparatus for suppressing dust, and more particularly to novel dust suppressor apparatus for use in suppressing the discharge of dust associated with particulate material, such as grain, in a conveying and discharge system.

With the enactment of legislation dealing with the protection of air quality, control of dust associated with conveying and discharge of many types of particulate or granular materials, such as grain, coal, powder chemicals and the like, has become a significant concern. The enacted legislation places restrictions on acceptable levels of dust emissions which are generally associated with loading of such granular materials into conveying vehicles such as trucks, rail cars, ships and barges.

Numerous attempts have been made to reduce dust emissions in the transport and discharge of particulate or granular materials having dust associated therewith. One type of dust control device for use in loading grain operates on the principle by which grain is brought to a near stop in an enclosed box and allowed to flow gently to a grain pile kept within a few feet of the discharge end of the control device. The entire dust suppressor apparatus or device is aspirated with an air envelope which engulfs the grain stream as it is discharged so as to prevent dust from escaping into the atmosphere.

Another type of known dust control or suppressor device used in handling grain, generally termed a non-aspirated vertical type suppressor, operates on the principle of slowing the discharging grain to a near stop, building and maintaining a constant head of grain within the unit to achieve a cushioning effect for the falling grain, and then allowing the grain to be discharged in a constant, compact non-turbulent stream at substantially the same rate at which it enters the suppressor unit.

Still another type of apparatus or device for suppressing dust in grain loading systems is generally termed an inclined suppressor and works on the principle of choked or restricted feed. In this type of device, material flowing down a spout or chute passes through a self-cleaning deadbox chamber above a spring loaded, or counter-weighted or otherwise controlled door which restricts the flow of grain. The weight of the flowing granular material pushes the door or control gate open and allows the material to flow at a relatively low velocity with a streamlined flow and shaping of the grain while forcing the dust back into the grain within the deadbox chamber. It is the latter type of dust control apparatus with which the present invention relates.

SUMMARY OF THE INVENTION

In accordance with the present invention, a dust suppressor apparatus is provided for use in a system for conveying and discharging particulate or granular material, such as grain and the like, from a primary source, such as a grain elevator, to a discharge station where the granular material is loaded into a transport vehicle such as a truck, rail car, barge or ship. The granular material is passed by gravity flow at a relatively high velocity from the primary source through an inclined tubular conduit or the like having a dust suppressor at its lower end from which the granular material is discharged into the transport vehicle. In accordance with the invention, the dust suppressor has an internal chamber and an inlet opening enabling the granular material to be introduced into an upper region of the chamber from which the materail drops to a lower region adjacent a discharge opening. A control or suppressor gate is hingedly mounted on the housing and is biased toward a closed position across the discharge opening so as to prevent flow therethrough until a predetermined quantity of granular material acts on the control gate and opens it to allow metered bulk discharge at relatively low velocity. The control or suppressor gate maintains pressure against the discharging granular material so as to prevent egress of dust ladened air which is caused to proceed back up the spout. to a dust pickup station. Pressure may be maintained by means of a spring or counterweight, the latter being preferred when the suppressor is operated in vertical and angular positions.

In accordance with one feature of the invention, the dust suppressor housing has a baffle disposed within the internal chamber so as to slow down the granular material as the material passes through the suppressor housing. The baffle is desirably adjustable to vary resistance to the granular material flowing through the dust suppressor.

In accordance with another feature of the invention, the suppressor housing is provided with a bypass opening and associated closure member operative to enable selective unobstructed passage of granular material directly through the dust suppressor for passage to a wing tank or the like. A wing tank adapter is preferably pivotally mounted on the suppressor housing and is moveable to a position to receive the granular material discharged from the bypass opening and guide the material to a wing tank loading chute.

Still another feature of the invention lies in making the suppressor housing from a lightweight highly abrasion resistant and durable non-metallic material such as polyurethane, and constructing the housing from a plurality of modular sections which facilitate ease of replacement in the event of damage thereto.

Further objects and advantages of the present invention, together with the organization and manner of oeration thereof, will become apparent from the following detailed description of the invention when taken in conjunction with the accompanying drawings, wherein like reference numerals designate like elements throughout the several views.

BRIEF DESCRIPTION OF THE DRAWINGS

FIG. 1 is a diagrammatic view of a system for conveying and discharging particulate or granular material which employs dust suppressor apparatus in accordance with the present invention, portions being broken away for purposes of clarity;

FIG. 2 is an enlarged view of the inlet end of the dust suppressor apparatus employed in the system of FIG. 1, taken substantially along line 2—2 of FIG. 1;

FIG. 3 is an enlarged view of the discharge end of the dust suppressor apparatus, taken substantially along line 3—3 of FIG. 1 but with the bypass adapter being fragmentarily shown in its raised non-operating position;

FIG. 4 is an enlarged side elevational view of the dust suppressor apparatus employed in the system of FIG. 1, portions being broken away for purposes of clarity;

FIG. 5 is a fragmentary sectional view taken substantially along line of 5—5 of FIG. 4; and FIG. 6 is a fragmentary perspective view illustrating the hinge connection of the suppressor discharge control gate and the associated spring biasing means, the suppressor control gate being illustrated in closed position in solid lines and in an open position in phantom.

FIG. 7 is a side elevational view of an alternate embodiment of the invention which illustrates a dust suppressor using a counterweight to provide pressure to the suppressor gate.

FIG. 8 is a longitudinal sectional view of the dust suppressor of FIG. 7.

DESCRIPTION OF PREFERRED EMBODIMENT

Figure 9:
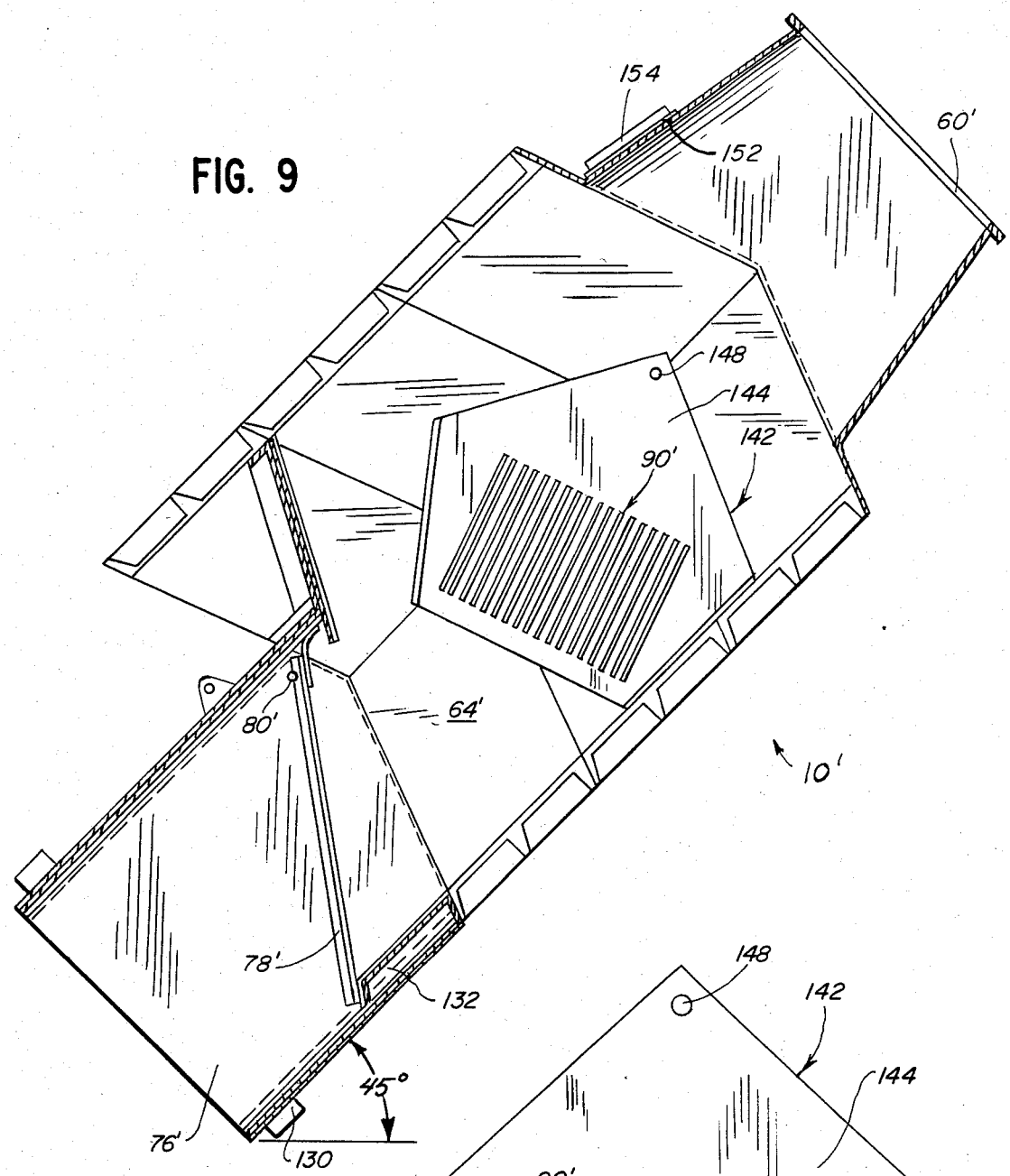
FIG. 9 is a cross-sectional view similar to FIG. 8 except that the dust suppressor is shown disposed at a 45 degree angle.

Referring now to the drawings, and in particular to FIG. 1, a dust suppressor apparatus or device constructed in accordance with the present invention is indicated generally at 10. The dust suppressor apparatus is illustrated, by way of example, as being employed in a system, indicated generally at 12, for conveying particulate or granular material, such as grain, from a primary source (not shown) such as a grain storage elevator to a loadout position where the particulate material may be discharged directly into a conveying vehicle or to a remote conveying means or wing tank storage facility. Very generally, the system 12 includes a tubular conduit or spout 14 which is preferably inclined downwardly at an angle of approximately 35–70 degrees relative to horizontal and has its upper end suitably affixed to the discharge end of a tubular conduit 16. Conduit 16 may form the discharge spout of a grain elevator or the like (not shown) from which granular or particulate material is removed for loading into conveyor vehicles. For purposes of illustration, the system 12 will be discussed in conjunction with the transfer of grain from a primary source, such as a grain elevator, to a discharge or offloading station where the grain is discharged into a transport vehicle or a remote temporary storage tank, e.g., ship wing tank.

As will become more apparent hereinbelow, the dust suppressor apparatus 10 finds particular application in system for conveying and discharging particulate or granular material with which dust is generally associated and where it is necessary to suppress the dust admitted to the atmosphere in order to meet governmental standards of air quality control. Examples of particulate or granular materials other than grain with which the dust suppressor apparatus 10 of the invention finds application include coal and powdered or granular chemicals. The dust suppressor apparatus 10 is adapted to prevent the discharge or egress of dust ladened air associated with the granular material during discharge into a conveyor vehicle and causes the dust ladened air to pass upwardly in the conduit 14 where it is drawn off through a tubular conduit 18 which is preferably connected to the conduit 16 so as to communicate with the upper region of conduit 14. The conduit 18 facilitates passage of the dust ladened air to a dust pickup station (not shown) where the dust is removed from the air.

In the system illustrated in FIG. 1, the conduits 16 and 18 have their lower ends supported by a substantially horizontal wall or support 22. The dust suppressor apparatus 10 is positioned to overlie transport vehicles, such as indicated in phantom at 24, supported on the ground or other suitable support surface 26. The dust suppressor apparatus is adapted to discharge granular or particulate material directly into the conveyor vehicle 24 or may be adapted to convey granular material to a remote wing tank, such as indicated generally at 30, through a wing tank spout or conduit comprised of one or more sections of tubular flow conduit two of which are indicated at 32a and 32b in FIG. 1. The wing tank 30 may be for purposes of temporary storage or may comprise a source from which the granular material is removed for subsequent loading into a conveying vehicle such as a barge or ship. In the illustrated embodiment, a funnel member 34 is supported on the wing tank 30 to receive granular material from the wing tank conduits 32a, b for guiding the granular material into the wing tank 30.

Referring particularly to FIG. 4, taken in conjunction with FIGS. 2 and 3, the dust suppressor apparatus 10 includes a housing 40 which is preferably made from a plurality of similarly shaped modular sections adapted for releasable connection so as to facilitate replacement of one or more of the modular sections should they become damaged. In the illustrated embodiment, the housing 40 includes four modular sections 42a, 42b, 42c, and 42d. Each of the modular sections 42a–d is of generally U-shaped configuration having slightly outwardly diverging side walls 44 which are formed integral with a transverse connecting wall 46. Each modular section has end flanges extending outwardly from the laterally opposed side walls 44, such as shown at 48a and 48b on modular section 42a, to facilitate side-by-side connection of the modular sections, and has an intermediate flange 48c providing structural strength. Outwardly extending generally longitudinal flanges 48d are formed at the marginal free edges of the side walls 44 to facilitate connection of the modular sections in end-to-end relation. Preferably, longitudinal reinforcing webs 50a and 50b (FIG. 2) are formed integral with the transverse walls 46 to provide increased strength and rigidity to the modular sections.

The modular housing sections 42a–d are preferably made from lightweight, highly abrasion resistant and durable nonmetallic material such as a polyurethane composition available under the tradename RHINO HYDE from Cargill, Inc. The flanges 48a, 48b and 48d of the modular housing sections enable releasable assembly of the modular sections in both side-by-side relation and end-to-end relation through suitable fastening means such as connecting bolts so as to form a dust suppressor housing 40 as illustrated in FIG. 4. With four modular sections connected as shown in FIG. 4, a lower planar end plate 54 and an upper inlet end plate 56 are releasably connected to the coplanar flanges 48a and 48b on modular sections 42a and 42c, respectively, as shown in FIG. 2. The inlet end plate 56 has a tubular spout portion 58 which defines a circular inlet opening 60 to facilitate the introduction of granular material into the housing 40. The outer end of the spout 58 has an annular flange 62 formed thereon to facilitate connection to the spout or conduit 14. With the inlet end plate 56 being mounted on the upper housing module 42c, granular material entering the inlet opening 60 passes into the uppper region of an internal chamber or cavity 64 defined within the housing 40.

The end of the housing 40 opposite the inlet end plates 54 and 56 defines the discharge station 28 and a bypass station, indicated generally at 68. The discharge station 28 is defined by a generally U-shaped shell having a pair of laterally spaced generally pie-shaped side walls 72a and 72b which have their upper edges formed integral with a transverse wall 72c. The upper or inner edge of wall 72c is formed upwardly at 74a and the outer edge is formed with a depending lip 74b. The side walls 72a,b are preferably affixed to the lateral flanges on the modular housing section 42b so that the side walls 72a,b form forward extensions of the side walls 44 and define a discharge opening 76 at the lower regions of the internal chamber 64. In this manner, granular material entering the inlet opening 60 into the upper region of the internal chamber 64 passes by gravity to the lower region of the chamber and toward the discharge opening 76, it being noted that the transverse walls 46 of the modular sections 42a,b form a downwardly inclined floor of the internal chamber.

In accordance with an important feature of the present invention, discharge of granular or particulate material from the internal chamber 64 of the dust suppressor apparatus 10 through the discharge opening 76 is selectively controlled by a suppressor control gate or door 78 which is pivotally or hingedly mounted adjacent the discharge opening 76 for pivotal movement about a transverse support shaft 80 having its opposite ends suitably affixed to and between the side plates 72a,b adjacent the upper end of the discharge opening 76, as shown in FIG. 6. The suppressor control gate 78 may comprise a generally planar plate member which is of a size sufficient to substantially fully close or cover the discharge opening 76 and is biased toward a closed position over the discharge opening by biasing means in the form of a torsion spring 84 coiled about the pivot shaft 80 and having a loop portion 84a acting against the outer surface of the control gate 78 and having opposite ends 84b acting against the transverse wall 72c. Other types of torsion springs could also be used. A transverse seal member 86 is affixed to the upper edge of the transverse wall 72c so as to extend along the hinge area of the control gate 78 and associated pivot shaft 80 to prevent passage of particulate material or dust through the hinge area.

The torsion spring 84 is selected so as to maintain the suppressor control gate 78 in closed position until a predetermined quantity of particulate or granular material has accumulated within the lower region of the housing 40. When the selected predetermined quantity of granular or particulate material has accumulated within the internal chamber 64 at the discharge opening 76, its weight acts against the suppressor control gate 78 so as to open the gate against the closing force of the torsion spring 84 and effect discharge to a waiting conveyor vehicle such as shown at 24 in FIG. 1. The suppressor control gate 78 and its associated torsion spring 84 are selected to exert a substantially constant pressure against the discharging granular or particulate material so as to insure metered bulk discharge while preventing the discharge or egress of dust ladened air. By metering the discharge of granular material from the internal chamber 64 of the dust suppressor 10, the dust ladened air is maintained at the upper region of the internal chamber 64 above the granular material and proceeds upwardly through the upper region of the tubular spout or chute 14 where it is drawn off through the conduit 18 to a dust pickup facility (not shown). In certain installations, it is desirable to vary the pressure applied at different delivery angles and this can be accomplished by employing a counterweight biasing means as shown in the alternate embodiment illustrated in FIGS. 7 to 10, inclusive. Such variable pressure means is described hereinafter.

To insure that the particulate or granular material passing from the upper region of the inlet chamber 64 in the dust suppressor toward the lower discharge opening 76 is sufficiently broken up to facilitate metered bulk discharge without clogs of material, a plurality of transverse parallel spaced baffle plates 90 are affixed at their opposite ends to the opposite side walls of the housing 40 so that the baffle plates 90 lie in a plane generally transverse to the chamber 64. To this end, the ends of the baffle plates 90 are secured to a pair of laterally spaced support brackets 92a and 92b which are in turn affixed to the opposite side walls of the housing so that the baffle in the path of flow of granular material from the upper region of the chamber 64 toward the discharge opening 76. The baffle plates 90 are spaced apart sufficiently to enable free flow of granular material therebetween but operate to break up clods of granular material and reduce material velocity as it progresses toward the discharge opening 76.

As aforementioned, the dust suppressor apparatus 10 is operable in a bypass mode in which the granular material entering the inlet opening 60 in the upper region of the internal chamber 64 may be passed directly through the housing 40 without discharging through the discharge opening 76. The bypass mode finds particular application when the conveyor vehicle or other facility in which it is desired to discharge the granular or particulate material cannot be positioned to directly underlie the discharge station 28 of the dust suppressor apparatus 10. In this situation, the dust suppressor apparatus is conditioned to bypass the granular material directly through the dust suppressor apparatus to the tubular conduits 32a,b for passage to a wing tank, such as shown at 30 in FIG. 1, or to the hold of a ship spaced some distance from the normal position of dust suppressor apparatus 10.

To facilitate bypass of particulate material from the dust suppressor apparatus 10, the bypass station 68 includes a bypass door 96 which is hingedly connected to the upper end 74a of the transverse wall 72c through a hinge 98 so that the bypass door forms a closure for the upper end of the housing 40 opposite the inlet end plate 56. The bypass door 96 carries latch means in the form of a pair of laterally spaced latches 100a and 100b mounted on the bypass door. The latches 100a and 100b have longitudinally moveable latch pins 102a and 102b, respectively, which are releasably received through suitable openings in an L-shaped bracket 104 mounted on a plate 106 secured transversely of the modular housing section 42d at the upper end thereof, as shown in FIG. 4. In this manner, release of the latch pins 102a,b from the retaining bracket 104 enables the bypass door 96 to be manually pivoted downwardly about its hinge or pivot axis to open the upper end of the housing 40 downstream from the inlet opening 60. Other types of latches could also be used.

To assist in guiding the particulate material from the bypass section 68 of the dust suppressor apparatus 10 during a bypass mode of operation, a bypass adapter 110 is preferably pivotally mounted on the dust suppressor housing 40 for movement between a position spaced from the bypass station 68, as shown in solid lines in FIG. 4, and an operating position wherein the bypass adapter is aligned with the bypass opening established when the bypass door 96 is opened as shown in phantom in FIG. 4. The bypass adapter has a generally rectangular-shaped entrance end 110a which tapers toward a cylindrical tubular discharge end 110b. The entrance end 110a has a pair of support arms 112a and 112b fixed thereto which are pivotally mounted at their outer ends on a pivot shaft 114 suitably mounted on the upper surface of the housing 40 in transverse relation thereto, as through a pair of laterally spaced support brackets 116a and 116b.

The support arms 112a,b enable the bypass adapter 110 to be pivoted upward to a nonoperating position resting on the dust suppressor housing, and facilitate downward pivotal movement of the adapter so as to encircle the bypass opening when the bypass door 96 is moved to an open position. With the adapter 110 in its operating position, an entrance end 32c on the wing tank extension conduit 32a may be inserted over the discharge end 110b of the bypass adapter so that granular material discharging through the adapter passes downwardly through the conduits 32a and 32b for discharge into the wing tank funnel 34 or into a remote conveyor vehicle. In the bypass mode of operation, the granular material which accumulates in the lower region of the suppressor housing is insufficient to open the suppressor control gate 78 against the action of the biasing torsion spring 84.

To assist in maintaining the conduit 32a in assembled relation with the bypass adapter 110, a pair of attaching arms, one of which is shown at 120 in FIG. 1, are pivotally mounted on the end 32c of conduit 32a and are adapted for releasable connection to the dust suppressor housing 40. Preferably, lift hooks, such as shown at 122 are attached to the upper surface of the housing 40 to facilitate handling.

Thus, in accordance with the present invention, a lightweight, abrasion-resistant dust suppressor apparatus is provided which finds particular application in systems for conveying and discharging particulate or granular material of the type with which objectionable dust is normally associated during discharge. In a normal dust suppressing mode of operation wherein the bypass door 96 is closed, granular material enters the upper region of the dust suppressor housing at a relatively high velocity. The grain comes to a stop in the suppressor housing and falls by gravity through the internal chamber 64, alternatively termed a deadbox area, into the lower region of the suppressor housing 40 where the granular material is discharged by a controlled metering action of the biased suppressor control gate or door 78. As the granular material passes from the upper to the lower region of the suppressor housing, its velocity is reduced by the transverse baffle plates 90.

The suppressor control gate 78 maintains substantially constant pressure against the discharging flow of grain so as to allow the grain and grain dust mixed therewith to exit, while preventing discharge of dust-ladened air.

In accordance with the invention, when it is desired to employ the dust suppressor in a bypass mode, the bypass door 96 is manually opened to enable direct flow of granular material from the inlet opening 60 directly through the suppressor housing and bypass discharge opening. Where dust suppression is not critical, this mode of operation enables discharge into an underlying conveyor directly through the bypass discharge opening. When the vehicle or facility into which the granular material is to be discharged is located some distance from the dust suppressor 10, the grain may be passed directly through the dust suppressor and through the adapter 110 and wing tank conduits 32a,b to the remote storage or conveying vehicle.

An alternate embodiment of the invention, as before indicated, is disclosed in FIGS. 7 to 10, inclusive. Corresponding parts to those shown in the first embodiment of the invention are indicated by like numbers but distinguished by the symbol prime ('). FIG. 7 shows the dust suppressor apparatus 10', which is built up from sections in like manner to that heretofore disclosed in the first embodiment. The dust suppressor apparatus 10' includes an inlet opening 60' and is adapted to be included in the system heretofore described. The granular material exits from the internal chamber 64' through a discharge opening 76'. Adjacent the discharge opening 76' are plastic bumpers 130 which protect the lower end of the dust suppressor 10' when in operation.

The suppressor control gate 78' is biased toward a closed position against a stop 132 attached to the side of the dust suppressor housing 40'. The control gate pivots with the transverse support shaft 80'. The transverse support shaft 80' connects to gears or wheels 134 disposed on opposite sides of the housing 40'. The gears or wheels 134 engage other gears or wheels 136 mounted on a second transversely extending shaft 138. The shaft 138 is fixedly connected at each end to a counterweight 140 on each side of the housing 40'. As shown, the dust suppressor apparatus is in a vertical position in FIGS. 7 and 8, and the counterweight 140, through the gears or wheels 134 and 136, serves to maintain the suppressor control gate 78' in a closed position against the stop 132. The counterweight can be adjusted to obtain a desired backup of granular material in the internal chamber 64' of the housing 40'.

As the dust suppressor apparatus 10' is moved from a vertical position to the tilted position illustrated in FIG. 9, i.e., about 45 degrees, the counterweight pressure is lessened and accommodates the shifting from the vertical position. This varies, of course, with the degree of tilt of the dust suppressor apparatus 10'. This variation in pressure upon the suppressor control gate 78' is desired in certain installations.

Figure 10:
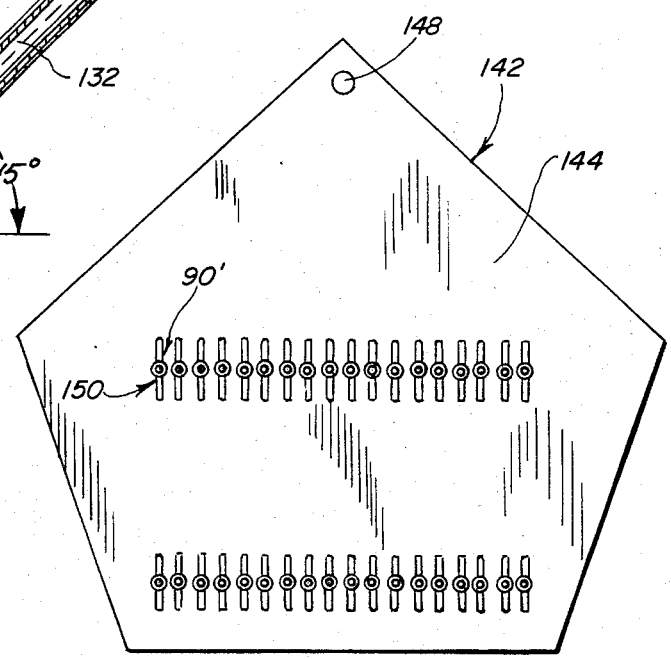
FIG. 10 is an outside view of the pentagonal plate shown in FIGS. 8 and 9 particularly illustrating the adjusting means for the baffle.

A modified baffle means 142 is illustrated in FIGS. 8 and 9. The baffle means 142 is generally in the form of an open-bottom bucket comprising a pair of end plates 144 which are generally pentagonal in shape. Transversely extending side plates 146 connect to lower side edges of the end plates and extend down to the open bottom. The end plates are pivotally supported on a shaft 148 journalled in the housing 40'. Thus, the baffle means 142 can swing upon tilting of the dust suppressor apparatus 10'. Also connected to the end plates 144 are transversely-extending baffle plates 90' which are independently vertically adjustable relative to one another. By moving the baffle plates 90', the surface area between adjacent plates can be varied and thereby vary the resistance to the flow of the granular material. The baffle plates, as illustrated in FIG. 10, include adjusting means 150 (FIG. 10) disposed on the outer faces of the end plates 144. Tilting of the dust suppressor apparatus 10', as illustrated in FIG. 9, causes the baffle means 142 to pivot until a side plate 146 abuts the side of the internal chamber 64'. This readily accommodates the tilting of the dust suppressor apparatus 10 and varies the baffle effect with such tilting. This is a desired feature of the invention for certain installations.

An access opening 152 is provided adjacent the inlet opening 60' and a cover plate 154 is provided. This opening 152, upon removal of the cover plate 154, permits breaking up any blockage which may occur at the inlet opening.

The embodiment shown in FIGS. 7 to 10, inclusive, does not include a bypass door 96. However, the bypass mode can be provided by one skilled in the art if desired.

The embodiment illustrated in FIGS. 7 to 10, inclusive, is particularly adapted to vertical delivery of granular material and the tilting of the dust suppressor apparatus 10' up to an angle of about 45 degrees in one direction. A mirror-image of the apparatus shown in the drawings can be placed adjacent the embodiment shown, thereby working in pairs, and allowing tilting of the dust suppressor apparatus 10' in the opposite direction by up to about 45 degrees. In such a further embodiment, the inlet opening 60' would span the duplicate internal chambers 64' provided.

While preferred embodiments of the present invention have been illustrated and described, it will be understood that changes and modifications may be made therein without departing from the invention in its broader aspects. Various features of the invention are defined in the following claims.

What is claimed is:

1. Apparatus for use in discharging particulate material while suppressing discharge of dust, said apparatus comprising, in combination:
    a housing defining an internal chamber and having an inlet opening enabling particulate material to be introduced into said internal chamber, said housing having a primary discharge opening enabling particulate material to be discharged from said chamber by gravity, said housing being made of a plurality of modular sections secured together so as to define said internal chamber, said modular sections being mutually releasable to facilitate disassembly of said housing,
    a suppressor control gate mounted on said housing for movement between a first position adapted to prevent discharge of material through said discharge opening and a second discharge position enabling gravity discharge through said discharge opening,
    and means biasing said suppressor control gate to its said first position until a predetermined quantity of particulate material acts on said control gate to overcome said biasing means and open said control gate, said control gate and biasing means being operative to exert substantially constant pressure on the particulate material discharging through said discharge opening so as to enable bulk discharge while preventing egress of dust ladened air through said discharge opening.

2. Apparatus as defined in claim 1 including means disposed within said chamber for reducing the velocity of said particulate material as said material passes from said inlet opening to said discharge opening.

3. Apparatus as defined in claim 2 wherein said means for reducing the velocity of said particulate material comprises a plurality of spaced baffle plates disposed transversely of said chamber.

4. Apparatus as defined in claim 3 wherein said baffle plates are pivotally supported in said internal chamber.

5. Apparatus as defined in claim 1 wherein said housing defines a bypass opening communicating with said internal chamber, and closure means mounted on said housing for movement between a first position closing said bypass opening and a second position enabling flow of particulate material from said inlet opening through said bypass opening.

6. Apparatus as defined in claim 5 wherein said internal chamber has an upper region and a lower region, said inlet opening being positioned so that particulate material is introduced into said upper region, said primary discharge opening being located so that said particulate material is discharged from said lower region, said bypass opening communicating with the upper region of said internal chamber and enabling particulate material from said inlet opening to be discharged from said bypass opening when said control gate is in its said first position.

7. Apparatus as defined in claim 1 wherein said housing is made from a lightweight durable plastic material.

8. Apparatus as defined in claim 1 wherein said control gate comprises a plate member hingedly connected to said housing adjacent said discharge opening, said biasing means comprising a torsion spring operatively associated with said housing and said plate member so as to bias said plate member to a position closing said discharge opening.

9. Apparatus as defined in claim 8 including seal means mounted on said housing so as to prevent dust laden air from discharging from said internal chamber in the area of said hinged connection of said plate member to said housing.

10. Apparatus as defined in claim 1 where said control gate comprises a plate member hingedly connected to said housing adjacent said discharge opening, said biasing means comprising counterweight means on said housing and connected to said plate member so as to bias said plate member to a position closing said discharge opening.

11. Apparatus as defined in claim 1 wherein said internal chamber has an upper region and a lower region, said inlet opening being positioned so that particulate material is introduced into the upper region of said chamber, said primary discharge opening being located so that said particulate material is discharged from said lower region of said chamber.

* * * * *

UNITED STATES PATENT AND TRADEMARK OFFICE
CERTIFICATE OF CORRECTION

PATENT NO. : 4,552,573

DATED : November 12, 1985

INVENTOR(S) : Bruce T. Weis; Nash N. Helmy; David E. Tweet; Bruce W. Moechnig

It is certified that error appears in the above-identified patent and that said Letters Patent is hereby corrected as shown below:

Column 2, Line 6, change "materail" to --material--.

Line 16, after "spout" delete period.

Line 46, change "oeration" to --operation--.

Column 3, Line 49, change "system" to --systems--.

Column 4, Line 67, change "uppper" to --upper--.

Column 6, Line 19, after "baffle" insert --plates lie--.

Line 48, change "pIate" to --plate--.

Signed and Sealed this

Sixth Day of May 1986

[SEAL]

*Attest:*

DONALD J. QUIGG

*Attesting Officer*       *Commissioner of Patents and Trademarks*